May 7, 1940.  T. K. LOWRY  2,199,670
APPARATUS FOR RENDERING AND EXTRACTION
Filed Sept. 17, 1936  3 Sheets-Sheet 1
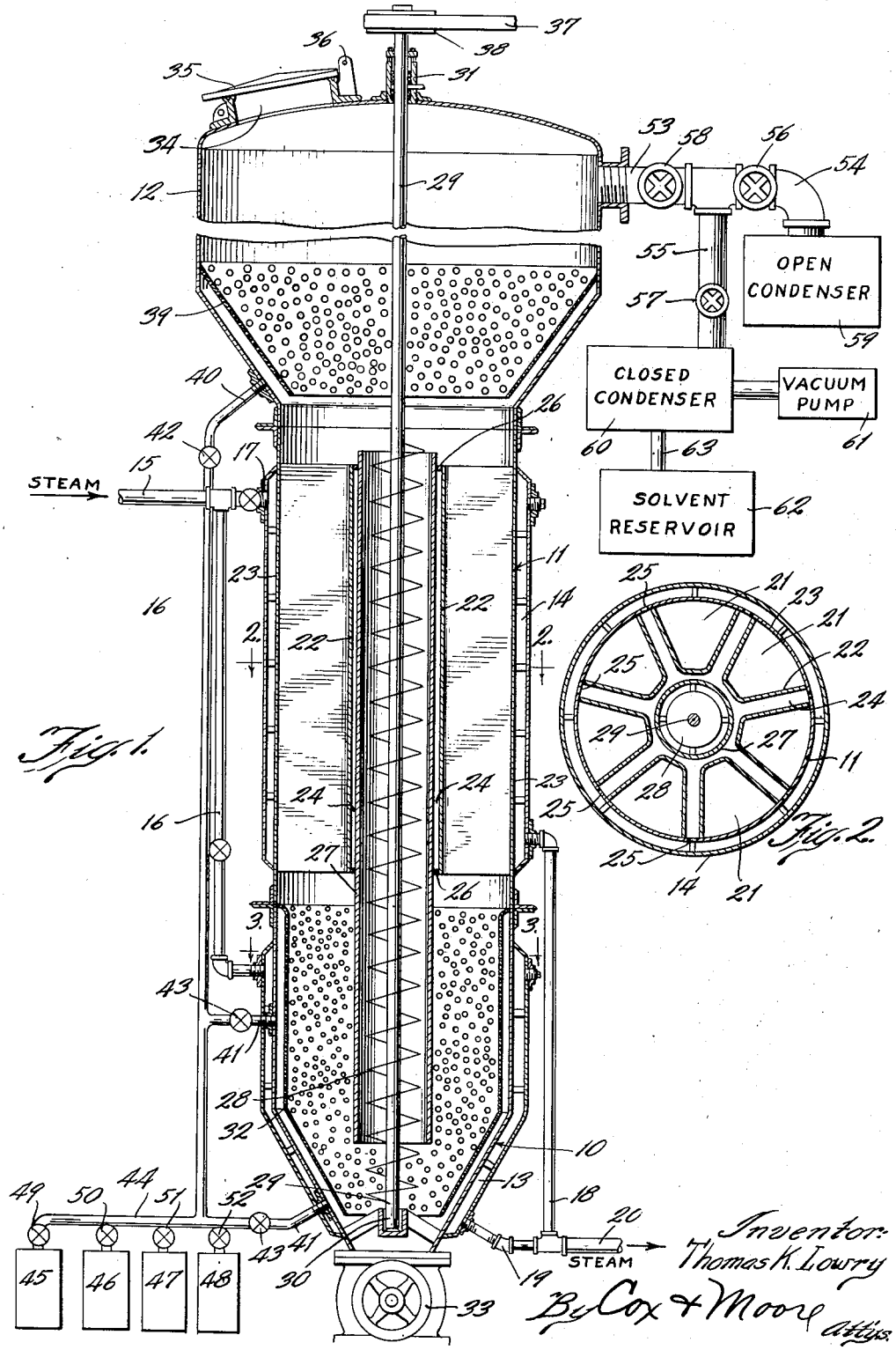

May 7, 1940.　　　T. K. LOWRY　　　2,199,670
APPARATUS FOR RENDERING AND EXTRACTION
Filed Sept. 17, 1936　　　3 Sheets-Sheet 2
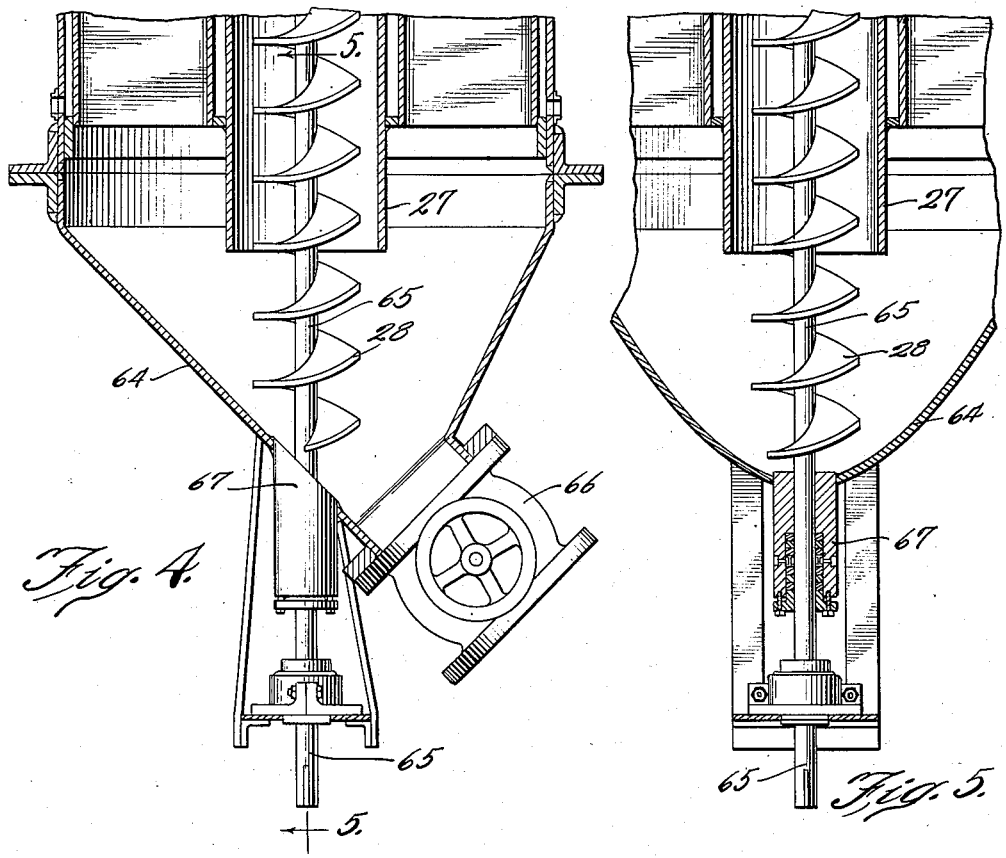
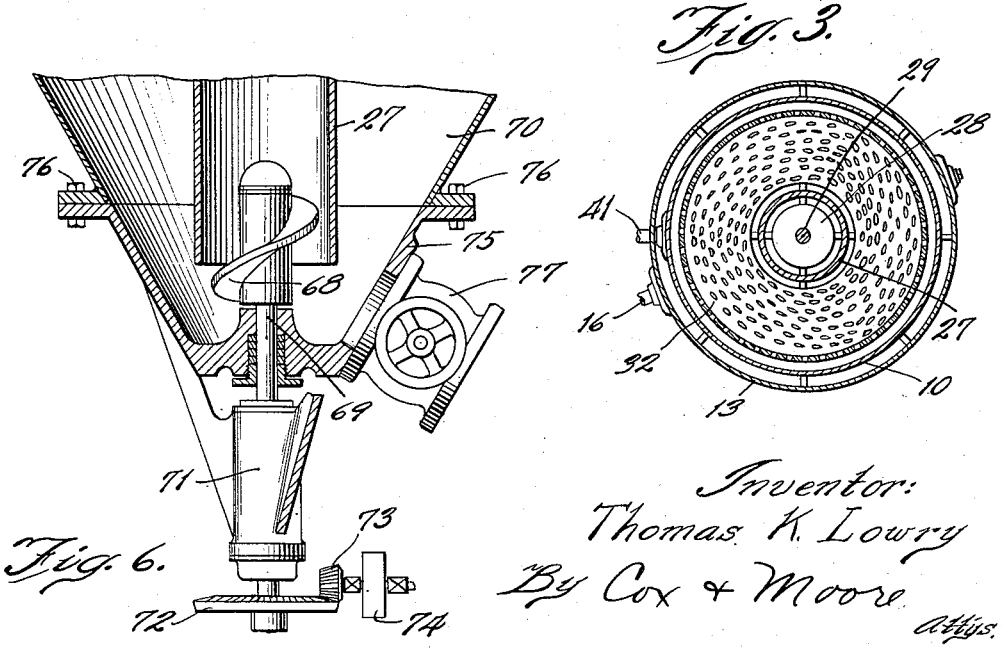
Inventor:
Thomas K. Lowry
By Cox & Moore
Attys.

Inventor
Thomas K. Lowry
By: Cox & Moore
attys.

Patented May 7, 1940

2,199,670

UNITED STATES PATENT OFFICE 2,199,670

APPARATUS FOR RENDERING AND EXTRACTION

Thomas K. Lowry, Chicago, Ill., assignor to Darling & Company, Chicago, Ill., a corporation of Illinois Application September 17, 1936, Serial No. 101,344

14 Claims. (Cl. 210—150.5)

The present invention relates to an apparatus and method for removing fats, and glue from material such as bones, hide trimmings, or any vegetable matter, or animal matter including fish from which fat or glue is obtained.

Two of the primary objects of this invention are to provide means to remove fatty material by heating the above raw products and physically separating it from the cooked mass, and to thereafter physically separate the glue from the residue if there is glue in the residue, or if desired, the apparatus or method may be used for carrying out either of these objects independently.

One of the objects of this invention is to provide apparatus and process by which the cooking of the aforesaid products may be carried on efficiently and economically in a single heating chamber from which the liquid products can be drained without removing the mass therefrom.

Another object of this invention is to provide a process which comprises the steps of rendering the mass to liberate and liquefy the fat and reduce the moisture content of the mass, thereafter removing the fat from the chamber, and finally heating the residue with water to extract the glue from the residue, and to provide a single heating unit for carrying out this process, the material being continuously circulated in said heating unit.

Another object of this invention is to provide a process whereby the material to be rendered may be heated to remove the fat therefrom and subsequently heated with water to remove the glue therefrom. The first step of the process is preferably carried on at a relatively low temperature, and the final extraction of the glue is carried on at a higher temperature, the process being carried out while the material is continuously circulated in the same heating chamber, provision being made to remove the liquid products without removing the mass from the chamber.

Another object of this invention is to provide a process for extracting glue from a glue and fat bearing material in a single stationary chamber which comprises the steps of heating the material and removing the fat therefrom including a step for the solvent extraction of the fat which clings to the residue after the major portion of the fat has been drained from the chamber, and subsequently heating the material with water to extract the glue therefrom.

A still further object of this invention is to carry on in a single chamber the steps of rendering a fat and glue bearing material, solvent extracting fat which clings to the residue after the step of rendering, and the subsequent heating of the residue with water to extract the glue therefrom.

Another object of this invention is to provide a process for heating a mass of fat or glue bearing material in a vessel and providing a positive circulating means for circulating the material in the said vessel, the material being forced from one point in the mass of material to another point in that mass and then returned to the first point.

Another object of this invention is to provide a process in which the material is positively agitated and is also circulated in a closed path within a heated chamber, the material being subjected simultaneously to the action of heat throughout the entire extent of its path of movement.

Another object of this invention resides in providing a suitable apparatus for carrying out the above objects.

A further object of this invention is to provide means for admixing suitable solvents or vehicles and the like with the aforementioned raw materials before they are treated in the heating and extraction chamber.

An additional object of this invention is to provide in combination with the heating chamber, means to mix therewith fats and the like.

It is furthermore an object of this invention to provide an improved process wherein a vehicle or the like is initially added to the raw material before any further steps such as extraction or rendering.

Another object of this invention is to provide suitable apparatus including a chamber with circulating means therein and conduits leading therefrom for withdrawing liquids from the chamber as and when desired.

An additional object of this invention is to provide a process and apparatus which can be used for dehydrating and extracting oils from vegetable products such as flax seed, cotton seed, and peanuts as well as for rendering and extracting fats and glue from animal matter.

Other objects of this invention will appear hereinafter as the description thereof proceeds, the novel features, arrangements, and combinations being clearly set forth in the accompanying specification and claims.

In the drawings:

Fig. 1 is a vertical section through a unit embodying my invention with auxiliary units shown somewhat diagrammatically attached to the unit which forms the major piece of apparatus for carrying out the objects of this invention;

Fig. 2 is a section taken substantially along the line 2—2 of Fig. 1;

Fig. 3 is a section taken substantially along the line 3—3 of Fig. 1;

Fig. 4 is a vertical section through a modified apparatus embodying my invention;

Fig. 5 is a section taken along the line 5—5 of Fig. 4;

Fig. 6 shows a still further modification of the apparatus embodying my invention;

Figure 7:
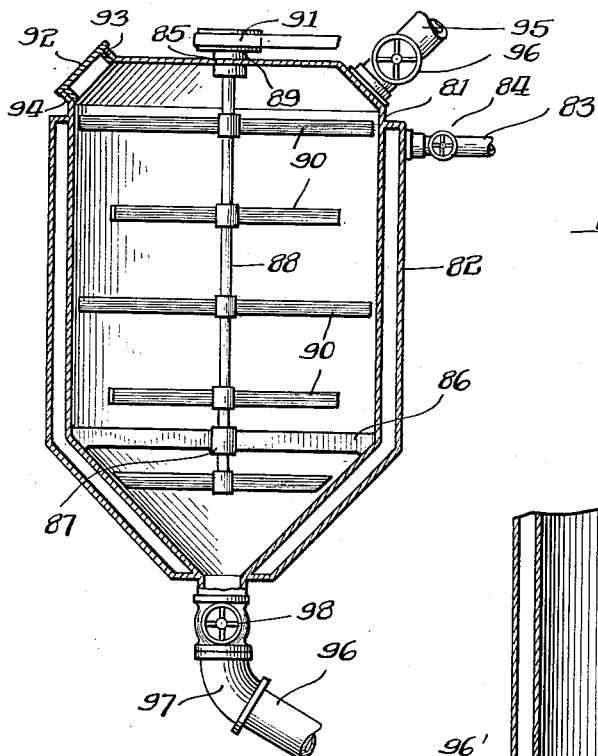
Fig. 7 is a preferred embodiment showing the lower end of the heating and extraction vessel broken away, the view being taken on a section across the diameter of the member and showing the connecting conduit and valve for connection to a mixing vessel.

More specifically the apparatus comprises in combination, a mixer and a heated chamber having a central tube spaced from the outer wall of the chamber, and a circulating means for circulating the material through said tube continuously in one direction, the material returning to a position to be again circulated by passing through the space provided between the tube and the walls of the chamber. The central passage is preferably heated by a heating medium within a steam jacket surrounding said chamber.

In one form of the invention, the chamber is of the vertical type and has a relatively large central passage in which there is arranged a screw conveyor or the like for conveying the material from one end of the tube to the other end thereof, the space surrounding the tubes being divided into relatively small passages to thereby give a greater amount of heat per unit of volume, and to thereby enable the process to be carried on in a very short period of time. The passages and central tube are preferably all steam jacketed so that the material is substantially constantly in contact with or closely adjacent to a heated surface.

The mixer comprises a closed steam heated vessel having paddles or other means to agitate its contents while they are being heated. Moreover, this mixer is connected by proper conduits or other means to discharge the product thereof into the aforementioned chamber for carrying out the succeeding process steps.

The apparatus which I use preferably comprises a lower material receiving chamber 10, a central heating chamber 11, and an upper vapor chamber 12 from which the vapor is withdrawn in a manner which will be hereinafter set forth. The chambers 10 and 11 are provided with steam jackets 13 and 14 respectively into which steam is introduced through the conduit 15 and branches 16 and 17, and withdrawn through the branches 18 and 19 which unite with the outlet conduit 20.

As will be clearly seen by an inspection of Figs. 1 and 2, the heating chamber 11 is divided into a plurality of passages 21 which are formed by the U-shaped partitions 22 which are welded to the inner shell 23 of the heating chamber to provide the steam spaces 24 which receive steam from the steam jacket 14 with which they communicate by means of suitable passages such as 25 in the cylindrical inner shell. There may be as many of the passages 25 as desired, some being near the bottom of the heating chamber, and some near the top so as to provide for the drainage of the condensed steam from the chamber as well as to permit the live steam to enter the same.

Of course, it is understood that the upper and lower ends of the steam spaces 24 are closed by plates 26 so that the steam does not itself come into contact with the material being heated.

The heating chamber is provided centrally with the tube 27, the outer surface of which forms with the U-shaped members 22 and inner shell 23 the steam spaces 24 hereinbefore referred to. This tube extends from the top of the heating chamber to a position near the bottom of the material receiving chamber 10 and a screw conveyor 28 carried by a shaft 29 rotating in bearings 30 and 31 extends through the tube 27 and as is clearly shown in the drawings has some clearance of an appreciable nature between the outer periphery thereof and the inner periphery of the tube 27. The reason for doing this is that material which is conveyed through the tube may be composed of relatively large pieces of material and may include bones, hide or other solid matter which might cause a jam to occur if the screw conveyor closely fitted the tube 27.

The material receiving chamber is provided with a perforated screen 32 which is held in spaced relation to the walls of the chamber to provide a chamber for receiving liquid which may be drained from the receiving chamber 10 without removing the residue or solid matter, and this screen also performs the function of preventing the solid material from obstructing the drainage passages through which the liquid is removed. The bottom of the chamber 10 is provided with a large valve 33 through which the residue may be dropped when desired.

The material to be rendered and/or extracted may be introduced through the charging opening 34 which is closed by a cover 35 hinged at 36 and any liquid used in the process may also be introduced through this charging opening. However, I prefer that this material be introduced through suitable tubes permanently connected to the apparatus and controlled by valves, which will hereinafter be described. The screw conveyor 28 is driven in any suitable manner and, in the drawings is illustrated as being driven by a belt 37 trained over a pulley 38 secured to the shaft 29. The chamber 12 is provided with a conical screen 39 which provides with the outer shell of the chamber a liquid receiving space from which the liquid may be withdrawn.

I have shown a conduit 40 connected to the chamber 12 at a point where the liquid accumulates between the screen 39 and the outer shell of the chamber. I have also provided similar conduits 41 leading from the chamber 10. These conduits have valves 42 and 43 therein to permit liquid to be drained through the conduits for the respective chambers when desired. The conduits 40 and 41 all lead to a distributing conduit 44 from which the liquid which is being drained from the chambers 12 and 10 may be distributed to the reservoirs 45, 46, 47, and 48 as desired by operating the valves 49, 50, 51, and 52. The reservoirs 45, 46, 47, and 48 diagrammatically represent receivers for different materials which may be drained from the respective chambers such as wash water which may be drained into 45, fat in 46, solvent in 47, and glue liquor in 48.

The vapor which is liberated during the cooking process is drawn off through a conduit 53 into either the conduit 54 or conduit 55 as controlled by the respective valves 56 and 57, there being a main control valve 58 in the conduit 53. The conduit 54 leads to an open condenser 59 and the conduit 55 leads to a closed condenser 60 which is shown provided with a vacuum pump 61. This condenser is also connected to a storage reservoir 62 by means of a conduit 63 from which the solvent can be withdrawn and used again in the process.

Referring to Fig. 7, there is shown a mixing device which is used in a preferred embodiment of my invention and is connected by a conduit to the lower portion of the heating chamber.

Figure 8:
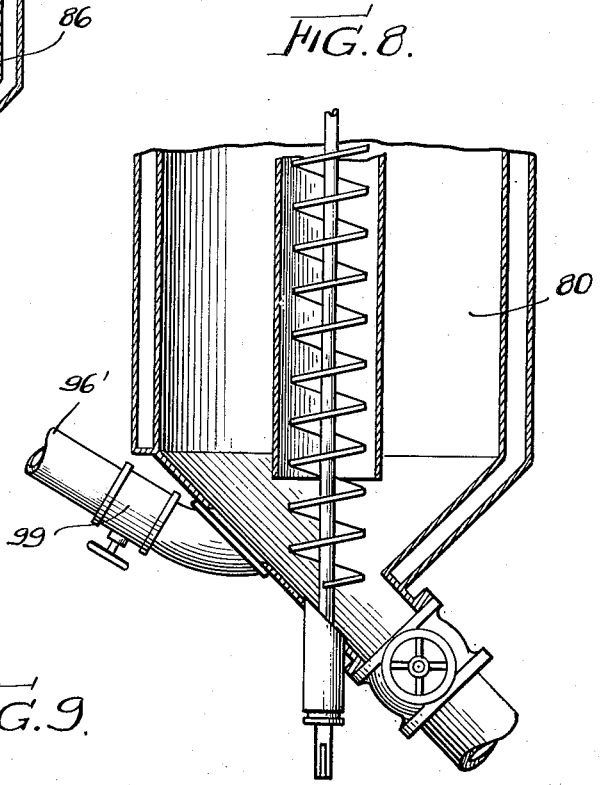
Fig. 8 is a sectional view taken transversely across the mixing chamber and showing the discharge conduit adapted to be associated with the heating and extraction vessel.

The heating and extraction unit 80 illustrated in Fig. 8, is substantially the same as those disclosed throughout the drawings. The mixing unit comprises a chamber 81 which is provided on the outer sides thereof with a jacket 82 welded, or otherwise fastened, securely around the outer surface of the chamber and suitable for the confining of steam or other heating fluid which may be introduced through the pipe 83 having thereon the valve 84. As is apparent from the drawings, the pipe 83 leads directly to the interior of the heating jacket. The chamber 81 is provided with a bearing 85 in the upper wall thereof and has a cross bar 86 secured rigidly therein as by means of welding or the like and being provided with an enlarged boss portion 87 forming a second bearing member.

In the bearings 85 and 87 a shaft 88 is mounted for rotation and positioned longitudinally by the collars 89 which may be secured adjustably to the shaft 88 by set screws, not shown. A series of paddles 90 are secured rigidly to the shaft 88 and extend transversely thereof. The shaft is driven by the pulley and belt 91 from any convenient source of power. Since it is the purpose of the paddles 90 to thoroughly mix and agitate material placed in the mixing chamber it will be obvious that these elements may comprise worms, propellers, blades or any suitable form of agitating member.

The chamber is provided with an inlet cover 92 having lips 93 adapted to fit interiorly of corresponding lips 94 on the chamber. A pipe 95 is provided which may be extended to any suitable source of fluid pressure and controlled by the valve 96 adapted to open or close communication of the pipe with the chamber.

A second conduit 96 is threaded into L 97 which in turn is secured to the valve 98, welded or threaded to the apex of the conical base portion of the chamber 81. Pipe 96 is intended to communicate with the bottom of the material receiving chamber shown separately in Fig. 8. Thus, as disclosed in this latter figure, the lower conical portion of the heating and extraction unit 80 may be provided with a valve 99 and a conduit 96' communicating with the interior thereof. In use this pipe is intended to be in communication with a mixing chamber such as that shown in Fig. 7 and may be directly connected with the outlet pipe thereof. For instance, in use the pipe 96 and the pipe 96' may be connected together.

Figure 9:
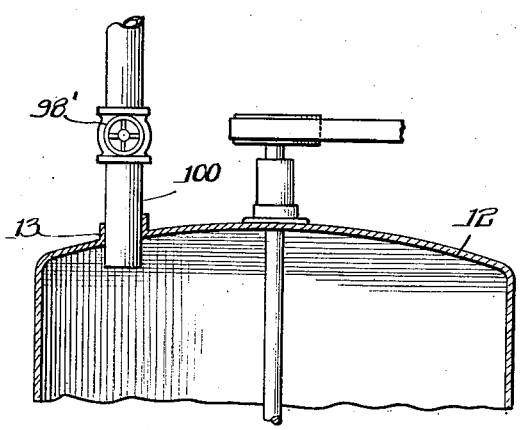
Fig. 9 is a sectional view showing an alternative arrangement whereby the mixing chamber may be associated with the extraction chamber, the latter being shown in partial section taken transversely thereof.

Referring to Fig. 9, there is shown an alternative arrangement in which the extraction chamber is adapted for connection with the mixing device when the latter is so positioned as to be situated above it. The upper portion of the chamber 12 is provided with an aperture 13 in which is secured a section of pipe 100. This section of conduit may be fitted at its upper end to the valve fitting 98. The valve 98 is intended to be placed in communication with a mixing chamber such, for instance, as the one in Fig. 7 and may be connected to the pipe 96. Thus, by merely opening the valve, the contents of the mixer will be discharged by gravity into the lower chamber.

In carrying out this process, the mass of material such as bones, hide trimmings, or any animal or fish matter from which fat and glue are obtained may be inserted through the charging opening 34 and steam is introduced to the steam jackets 13 and 14 as well as to the steam spaces 24. The rotation of the screw conveyor causes the material to be carried upwardly through the tube 27 into the chamber 12 and then downwardly through the passages 21 to the material receiving chamber 10. The material is heated during its travel through the tube 26 and passages 21 and the vapor which results is drawn off by means of the open condenser 59, the valves 58 and 56 being open and the valve 57 being closed. The process is continued until the desired amount of moisture is removed. During this heating or cooking step, the conditions may be varied as desired. However, one preferred embodiment involves cooking at a temperature in the neighborhood and not any time dropping below, 140°, while maintaining the interior of the cooking chamber under a 25-inch vacuum. Obviously, however, the temperature and pressure may be selected in accordance with the results desired. The fat which is also separated during the heating process is then ready for physical separation from the mass. This is accomplished by opening the valves 42 and 43 and opening the valve 50 which leads into the fat reservoir 46, it being understood, of course, that the remaining valves 49, 51, and 52 are closed.

Preferably in carrying on the extraction, some fat is added to the solid matter when it is first introduced into the charging chamber 12 to act as a vehicle for carrying the solid material and for distributing the heat to the material from the heated surfaces of the tube 27 and passages 21. In carrying out this process, with which I find that better results are obtained, I may employ a structure of the type illustrated in Figs. 7 and 8. Thus, instead of adding the raw material directly to the charging opening in the chamber 12, I add the bones, hide trimmings and the like, by first removing the cover 92 on the mixing chamber and directing the material through the opening formed thereby. I may then introduce any desired amount of fat or other desired vehicle in any quantity according to the nature of the product desired.

Thus I add any sufficient portion of fat or other vehicle which I find by experiment and trial to result in the desired heat distributing qualities and in lending the desired fluidity to the charge. The blades are then set in rotation on the shaft 88 and steam or other heating fluid is permitted to enter the jacket 82 by opening the valve 84 at the pipe 83 and the mass is heated to any desired degree for the purpose of facilitating mixing.

Moreover, the mass may be preheated to such an extent that the amount of heat which it is necessary to add in the chamber 12 will be considerably reduced.

This operation being complete, the valves 98 and 99 which have been heretofore closed, are turned to open position, as illustrated in Fig. 7, so that the contents of the mixing chamber may be discharged. In this embodiment I may create a vacuum by means of the vacuum pump 61 whereby the contents of the mixing chamber will be sucked into the chamber 10 and complete evacuation of the former chamber will occur, whereupon the valves 98 and/or 99 may be closed and the operation of rendering may proceed.

Moreover, through the medium of the pipe 95 which is led to a source of steam or compressed air or the like under pressure, the contents of the mixer may be forcefully expelled, to insure complete evacuation if necessary.

The mixing chamber may also be positioned above the charging chamber 12 as appears in Fig. 8. Thus, upon completion of the mixing step, I may, by merely opening the valve 98, permit the contents of the mixer to drop by gravity into the chamber 12.

I then introduce a solvent through the charging opening 34 or by means of suitable conduits permanently connected to the apparatus and to a solvent reservoir, and continue to circulate the material to extract the fat which clings to the residue within the apparatus. No vacuum or heat is necessary during this step of the process but may be used if found to be expedient. This solvent is then withdrawn into the reservoir 47 in a manner similar to the manner in which the fat was removed. The step of solvent extraction may be repeated as many times as is necessary to properly remove the fat and place the residue in proper condition to remove the glue therefrom. After the solvent extraction, steam is admitted to the remaining solvent within the apparatus and the closed condenser 60 is used to assist in the withdrawal of the solvent and for condensing the recovered solvent and discharging the same into the solvent reservoir 62.

After the solvent has been driven off, it may be desired to give the material a cold water wash to remove impurities, or to chemically treat the material similar to present practice in the treatment of glue stock. This may be done by introducing the water or chemicals through the charging opening 34 and thereafter removing the same through the conduits 40 and 41 into a receiving reservoir such as 45.

The last step in my process comprises the steps of heating the residue to remove the glue therefrom, with a quantity of water which acts as a vehicle for carrying the residue as it is circulated by the conveyor 28 and also as a means for dissolving the glue as it is liberated. The heat is applied to the steam jacket and the material can be cooked either under pressure or in a vacuum. It usually requires several washes of hot water to extract the glue, but as an alternative I may continuously introduce water into the system and remove the water at the same rate that it is introduced.

In carrying out my process, it is obvious that I utilize an extremely high amount of heating surface per unit volume both in the rendering process and in the glue extraction process. Also the three separate operations of rendering, solvent extraction, and glue extraction are carried on in the same chamber and more or less as a continuous operation which does not require removal of the material from one apparatus to another and the subsequent loss of time and heat. A large amount of heat is usually lost in transferring material from one apparatus to the other as a great many times, the subsequent piece of apparatus is not ready to receive a batch from a prior piece of apparatus.

In Fig. 4, I have shown a modified form of apparatus which is substantially the same as that shown in Fig. 1 except that the bottom of the material receiving chamber which is indicated by the reference numeral 64 is not in the form of a right section of a cone as illustrated in Fig. 1, but is a section of a cone which has its apex located to one side of the axis of rotation of the conveyor shaft 65, with the valve 66, which corresponds to the valve 33 in Fig. 1, located entirely to one side of the axis of rotation of the conveyor shaft 65. This permits the use of a bearing 67 on the outside of the apparatus in which the shaft 65 is journaled and enables the residue in the chamber 64 to be drawn off in a more efficient manner than with an apparatus such as illustrated in Fig. 1. With this arrangement, the shaft 65 can protrude below the apparatus and be connected to a driving means located at the bottom of the apparatus instead of at the top of the apparatus, the same being more accessible in the former position than in the latter.

In Fig. 6, I have shown a still further modification of the apparatus in which the screw conveyor 28 is eliminated, and in its place I use a helical impeller blade 68, the shaft 69 of which extends through the lower end of the chamber 70, and is mounted to rotate in a bearing 71. The lower end of shaft 69 is provided with a bevel gear 72 which is driven by means of a bevel pinion 73 which in turn is driven by means of a belt trained over a pulley such as 74 or in any other suitable manner. The helical impeller 68 forces the material upwardly through the tube 27 and leaves the tube substantially free from obstruction. In addition, it will be noted from an inspection of this figure that the impeller unit is mounted on a short section 75 of the chamber 70, and this can be removed with the impeller by merely removing the bolts 76 or the like which secure the section 75 to the bottom of the apparatus. This enables me to repair the apparatus or clean out the tubes without entirely dismantling the apparatus. In this form of the apparatus, the valve 77 is used for the same purpose as the valves 33 and 66 illustrated in Figs. 1 and 4.

A perforated screen, such as shown in Fig. 1, may be and is preferably used in the embodiments of the invention shown in Figs. 4, 5 and 6.

This apparatus and process is also applicable to the dehydrating and extraction of vegetable products such as flax seed, cotton seed, and peanuts. In carrying on this process, the vegetable product is placed in the apparatus and heated to separate the vegetable oil from the solid matter and the oil may be thereafter separated from the residue as previously set forth in connection with the rendering of meat, etc.

Reference is made to my prior application, Serial No. 643,183, filed November 18, 1932, of which this application is a continuation in part.

Obviously those skilled in the art to which this invention pertains may make various changes in the construction and arrangement of parts shown in the drawings without departing from the spirit of this invention, and therefore I do not wish to be limited except as hereinafter set forth in the appended claims.

Having thus fully described my invention, what I claim as new and desire to obtain by Letters Patent is:

1. In an apparatus of the class described, the combination with a hollow chamber, a substantially central passage therein, a plurality of passages surrounding said central passage in a peripherally extending row, means for heating said passages externally, and means in the central passage for positively forcing and circulating material through the said central passage in one direction by mechanical forcing means and forcing it through the other passages to a position where the same is again picked up and again circulated through said central passage.

2. In an apparatus for rendering, the combination with a hollow chamber, a substantially central passage therein, a plurality of small passages surrounding said central passage in a peripherally extending row, means for heating said passages externally substantially throughout their entire length and on all sides, and means arranged within said chamber for forcing and circulating material through said central passage in one direction and forcing it through the said other passages.

3. In an apparatus for rendering, the combination with a hollow chamber, a substantially central passage therein, a plurality of small passages surrounding said central passage, means for heating said passages externally throughout substantially their entire length and on all sides thereof, and means comprising a screw conveyor extending through said central passage for forcing and circulating material through said central passage in one direction and into the other passages.

4. In an apparatus for rendering, the combination with a hollow chamber, a substantially central passage therein, a plurality of small passages surrounding said central passage, means for heating said passages externally substantially throughout their entire length and on all sides thereof, and means comprising a driven impeller member for circulating material through said central passage in one direction and forcing it through the said small surrounding passages.

5. In a device of the class described, the combination of a unit comprising a charging chamber, a material receiving chamber, an intermediate heating unit having a plurality of passages each communicating with both of said chambers and heated externally, and a mechanical forcing means in one of said passages for positively forcing material through the said passages from one of said chambers to the other of said chambers and through the other passages, the material thereafter returning to its original chamber through the said other passages.

6. In a device of the class described, the combination of a heating unit comprising an upper charging chamber, a lower material receiving chamber, an intermediate heating unit having a plurality of passages each communicating with both of said chambers, and a forcing means in one of said passages for forcing material therethrough from one of said chambers to the other of said chambers, the material thereafter passing back from said latter chamber through the remaining passages into said former chamber, said receiving chamber having the lower portion thereof sloping downwardly toward the discharge opening at one side of said receiving chamber, and said forcing means being arranged away from said opening so as to not obstruct said opening and having the driving means for said forcing means extending through a portion of said bottom removed from said opening.

7. In a device of the class described, the combination with a unit comprising an upper charging chamber, a lower material receiving chamber, an intermediate heating unit having a plurality of externally heated passages each communicating with said charging chamber and said receiving chamber, and a mechanical forcing means comprising a screw conveyor arranged in one of said passages for positively forcing material through that passage from one of said chambers to the other of said chambers, and through the other of said passages, the material returning through others of said passages to a position to be recirculated by said mechanical forcing means.

8. In a device of the class described, the combination with a unit comprising an upper charging chamber, a lower material receiving chamber, an intermediate heating unit having a plurality of externally heated passages each communicating with said charging chamber and said receiving chamber, and a mechanical forcing means comprising a driven impeller in one of said passages for positively forcing material therethrough from one of said chambers to the other of said chambers and through the other of said passages to a position to be recirculated by said mechanical forcing means.

9. In a rendering unit, the combination with a tank having a lower material receiving chamber, a central heating chamber having an externally heated passage substantially centrally thereof, extending substantially to the bottom of said material receiving chamber, an externally heated passage between said central passage and the inner walls of said passage, the lower end of which opens into said material receiving chamber, a positively operating mechanical forcing means for forcing material from the material receiving chamber upwardly through said first passage and for discharging the same over the upper end of said second passage, whereby the material flows by gravity downward into said material receiving chamber, a liquid receiving space surrounding the inner periphery of said material receiving chamber, separated therefrom by a reticulated member for the liquid from the material, whereby liquid may be drained from the material without removing the material.

10. A device as set forth in claim 9, in which said central passage is provided with additional passages between the same and the inner wall of said container for returning the material to the said chamber.

11. A device as set forth in claim 9, in which said central passage is provided with additional passages arranged thereabout in a peripherally extending row.

12. A device as set forth in claim 9, in which said central passage is provided with additional passages arranged thereabout in a peripherally extending row with common spaces therebetween for a heating medium.

13. A rendering unit comprising a heating unit having a central tube within an outer shell and spaced therefrom, a peripherally extending row of passages having the walls thereof formed by substantially U-shaped channels, the edges of which abut said shell and are secured thereto in fluid tight engagement therewith, and means for closing the ends of the spaces between said U-shaped channels and said central tube to form an enclosed heating space for said tube and passages.

14. A device as set forth in claim 13, in which there is a positively driven impeller for forcing material through said tube.

THOMAS K. LOWRY.